United States Patent Office 3,048,636
Patented Aug. 7, 1962

3,048,636
OXIDATION OF OLEFINS BY THALLIUM (III)
Robert R. Grinstead, Concord, Calif., assignor to The Dow Chemical Company, Midland, Mich., a corporation of Delaware
No Drawing. Filed May 20, 1959, Ser. No. 814,369
9 Claims. (Cl. 260—586)

This invention relates to processes for oxidizing olefins and to catalysts for such processes.

The oxidation of olefins is a technically important process resulting in the formation of glycols, epoxides, aldehydes and/or ketones, depending on the particular olefin and the conditions under which the oxidation is conducted.

According to the invention, valuable oxygenated products are produced by oxidizing olefins by use of thallium (III) salts. The oxidation may be conducted in aqueous acid solution or in a suitable organic solvent.

Any soluble thallic salt may be used for the oxidation, suitable ones including the chloride, nitrate, sulfate and acetate. As a practical matter, the sulfate and nitrate are generally preferred. They are ordinarily employed in concentrations of about 0.1 to 2 molar, though higher or lower concentrations can be used.

The preferred solvent is water but organic solvents, such as acetic acid, propionic acid, tetrahydrofuran, methanol, ethanol, and the like may be used.

The oxidation is usually and most conveniently conducted at ordinary temperatures, i.e., about 20–30° C., but higher or lower temperatures may be used, especially when it is desired to increase or decrease the rate or severity of the oxidation reaction. Thus, higher temperatures, up to 100° C. or higher, may be used when oxidizing a sluggish or difficulty oxidizable olefine or when a more drastic oxidation is desired.

The principal products of this oxidation of olefins are glycols, aldehydes, or ketones, though esters or carboxylic acids may be formed in special cases or under extreme conditions.

In general, the preferred manner of practicing the invention comprises dissolving the thallic salt in a suitable solvent and then gradually adding the olefin to the salt solution. In case the olefin is a gas under normal conditions it may be bubbled into the salt solution, it may be pumped into a closed reactor under superatmospheric pressure, or the salt solution and the olefin may be passed counter-currently through a packed tower or other gas-liquid contact device. The oxidation product remains in the liquid phase while any unreacted olefin passes out in the gaseous phase and may be recovered or recycled.

The thallic salt is reduced to the thallous form [thallium (I)] and may be reoxidized to the thallic form by reaction with chlorine or other suitable oxidizing agent. The stoichiometric amount of thallic salt required is one mole per mole of olefin provided the latter undergoes only the primary oxidation. Any further oxidation, of course, requires additional thallic salt.

Substantially any olefin that is oxidizable by other known techniques is also oxidizable by use of thallic salts. The olefins of greatest technical interest are the lower alkenes, such as ethylene, propylene, butylene, isobutylene, hexene and octene and their substituted analogs, such as styrene, halogenated propenes and butenes; the alicyclic olefins such as cyclohexene, camphene, bornylene, pinene, menthene and the like.

The practice of the invention is illustrated by the following examples.

*Example 1.—Oxidation With Thallic Nitrate*

30 ml. of a 0.4 M solution of thallic nitrate in 0.1 M aqueous nitric acid were placed in a closed reactor fitted with stirrer, manometer and gas inlet and outlet tubes. Sodium hydroxide (0.4 M aqueous solution) was added to the point of incipient precipitation of thallic hydroxide (at pH of about 1–2), after which an atmosphere of ethylene gas was established in the reactor. Absorption of the gas and production of oxidation products, principally ethylene glycol, continued until substantially all the thallic salt had been reduced to the thallous state, there being no further reaction. The temperature was maintained at 22–23° C. throughout the oxidation. Analysis of the product showed that 32% of the ethylene absorbed had been converted to ethylene glycol and 6% had been converted to glyoxal.

In order to isolate the ethylene glycol the thallous ion was precipitated as TlCl by the addition of excess HCl and removed by filtration. Most of the water content of the filtrate was distilled off and the residue was diluted with isopropanol to precipitate inorganic salts. Distillation of the isopropanol solution yielded the glycol.

When the above experiment was repeated except that the concentration of thallic nitrate was 1.2 instead of 0.4 M, the yield of glycol was 29%.

*Example 2.—Oxidation With Thallic Sulfate*

When the experiment of Example 1 was repeated except that thallic sulfate and sulfuric acid were used instead of thallic nitrate and nitric acid, respectively, the yield of glycol was 45% and that of glyoxal was 3%. In an otherwise similar experiment in which the thallic sulfate was dissolved in 1 M sulfuric acid and no alkali was added, the yields of glycol and glyoxal were 36 and 15%, respectively.

*Example 3.—Oxidation With Thallic Chloride*

When the experiment of Example 1 was repeated except that thallic chloride and hydrochloric acid were used instead of thallic nitrate and nitric acid, respectively, the yield of glycol was 49%, while no glyoxal was produced. However, the reaction was slower than with the nitrate or sulfate.

*Example 4.—Oxidation With Thallic Acetate*

Thallic acetate was dissolved in glacial acetic acid to make a 0.7 M solution. This solution, to portions of which various amounts of water was added, was used to oxidize 2-hexene at a temperature of about 50° C. When little or no water was present the principal product was the monoacetate of 2,3-hexanediol while in the presence of larger amounts of water an increasing proportion of the product was 2-hexanone. Thus, with 2, 10 and 25% of water in the acetic acid solution the yield of glycol monoacetate was 55, 46 and 7%, respectively.

When 2-hexene was oxidized with aqueous acidic solutions of thallic sulfate, substantially as described in Example 2, the reaction, while slow, yielded oxygenated products, principally 2-hexanone.

Cyclohexene was readily oxidized by an acidified methanolic solution of thallic chloride, one of the products being cyclohexanone.

I claim:

1. A process for oxidizing an olefinic hydrocarbon to produce at least one product of the class consisting of glycols, aldehydes and ketones, said process comprising contacting the olefin with at least about an equimolecular amount of an acidic solution of a thallic salt in a solvent selected from the group consisting of water, acetic acid, propionic acid, tetrahydrofuran, methanol and ethanol.

2. A process as defined in claim 1 wherein the salt is thallic nitrate.

3. A process as defined in claim 1 wherein the salt is thallic sulfate.

4. A process as defined in claim 1 wherein the salt is thallic chloride.

5. A process as defined in claim 1 wherein the salt is thallic acetate.

6. A process as defined in claim 1 wherein the olefin is an alkene.

7. A process as defined in claim 1 wherein the olefin is ethylene.

8. A process as defined in claim 1 wherein the olefin is hexene.

9. A process as defined in claim 1 wherein the olefin is cyclohexene.

References Cited in the file of this patent
UNITED STATES PATENTS

| | | |
|---|---|---|
| 1,974,727 | Schwenk et al. | Sept. 25, 1934 |
| 2,773,909 | Smith | Dec. 11, 1956 |

OTHER REFERENCES

Preisler et al.: J. Phys. Chem., vol. 38, pp. 1099–1107 (1934).

UNITED STATES PATENT OFFICE
CERTIFICATE OF CORRECTION

Patent No. 3,048,636                                       August 7, 1962

Robert R. Grinstead

It is hereby certified that error appears in the above numbered patent requiring correction and that the said Letters Patent should read as corrected below.

Column 4, list of references cited, under "UNITED STATES PATENTS, add the following references:

2,393,532    Hearne et al.----- Jan. 22, 1946
        2,887,511    Wasley------------ May 19, 1959

Signed and sealed this 1st day of January 1963.

(SEAL)
Attest:

ERNEST W. SWIDER                               DAVID L. LADD
Attesting Officer                                     Commissioner of Patents